June 21, 1932. F. KLEIN 1,863,660
VEHICLE RUNNING BOARD MAT
Filed April 27, 1931 2 Sheets-Sheet 1
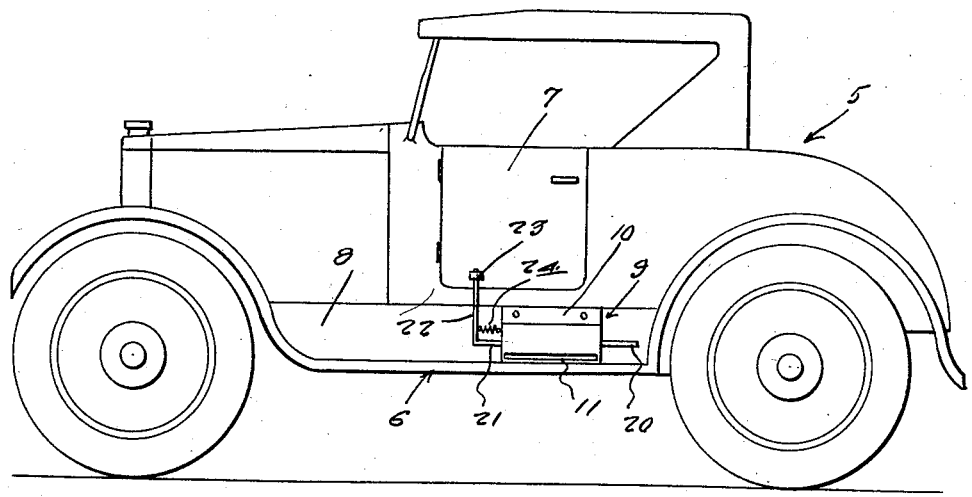
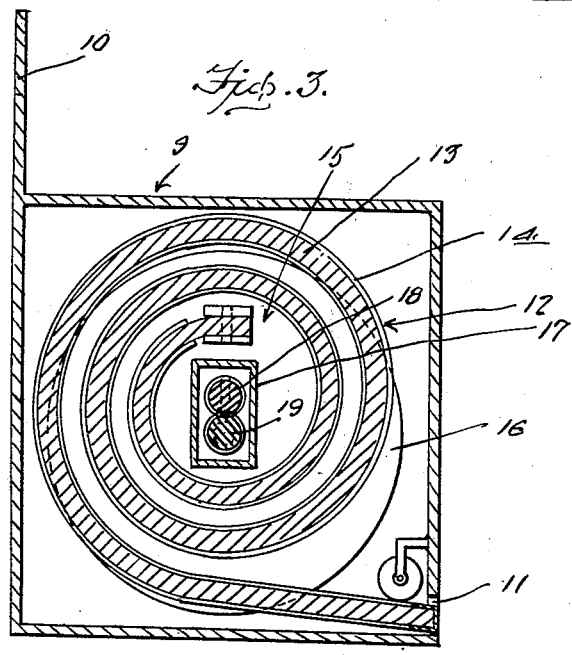
Inventor
Fred Klein
By Clarence A O'Brien
Attorney June 21, 1932.  F. KLEIN  1,863,660
VEHICLE RUNNING BOARD MAT
Filed April 27, 1931   2 Sheets-Sheet 2
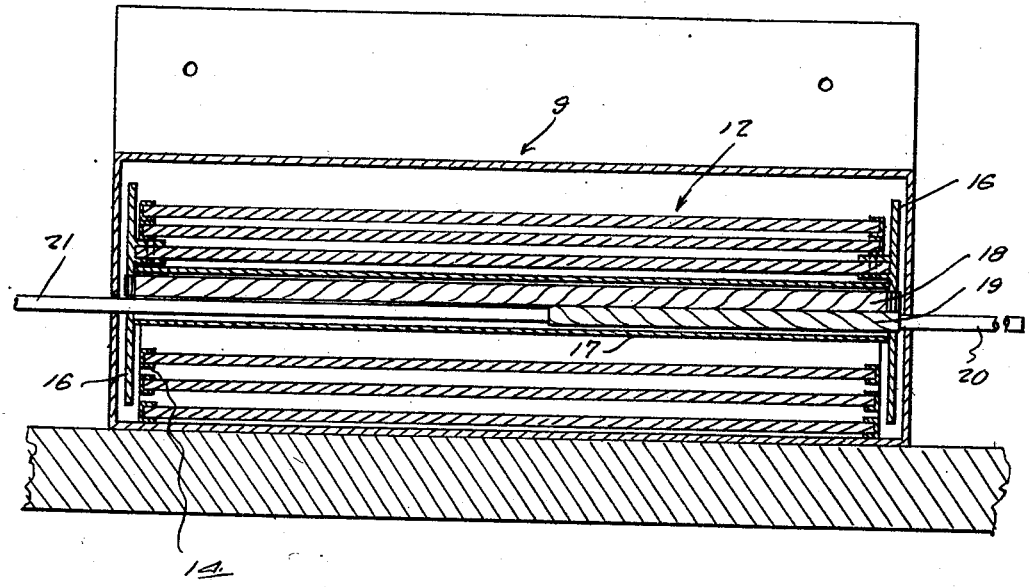
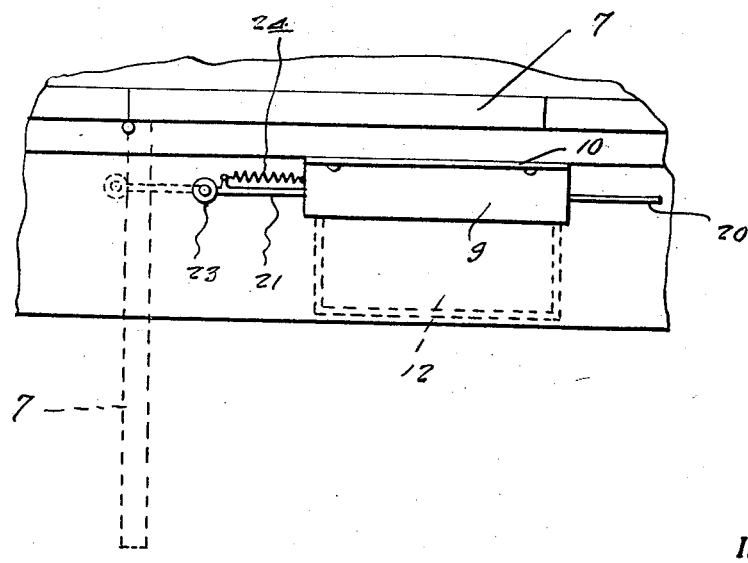
Inventor
Fred Klein
By Clarence A. O'Brien
Attorney Patented June 21, 1932

1,863,660

UNITED STATES PATENT OFFICE

FRED KLEIN, OF HOLLYWOOD, CALIFORNIA

VEHICLE RUNNING BOARD MAT

Application filed April 27, 1931. Serial No. 533,320.

This invention relates to an automobile accessory in the nature of a mat for use on the running board.

The inventive conception comprehends an arrangement which utilizes a mat of appropriate material which is normally wound on a spring-returned reel, the reel and mat being confined in a protective housing, means being provided to be actuated by the car door to extend said mat to usable position as the door is opened and as the occupant enters or leaves the car.

The idea is to provide a simple, economical, and practical foot wiping mat which is normally protected against the weather and which is projected for usage when desired, that is, when the occupant either leaves or enters the automobile.

The particular details and their relative arrangement and association will become more readily apparent from the following description and drawings. In the drawings:

Figure 1 is a side elevational view of a conventional automobile showing the appliance in operative position.

Figure 2 is an enlarged longitudinal sectional view through the wheel and casing construction.

Figure 3 is a transverse section.

Figure 4 is a fragmentary plan view showing the approximate method of operation and usage.

In the drawings, in Figure 1, the numeral 5 designates generally a conventional automobile having the customary present-day running board 6. The swingable hinged door is indicated at 7. These parts are conventional. The numeral 8 designates the depending apron. The attachment comprises two primary parts, namely, the mat and its casing, and the operating means for projecting and retracting the mat.

As seen in Figure 3, the casing is denoted by the numeral 9 and is here shown as rectangular in form and provided with an attaching flange 10 whereby it may be bolted or otherwise secured to the apron 8 just below the door 7. The front or outer wall of the casing is formed with a slot 11 through which the mat is workable. The mat is generally indicated by the numeral 12 and comprises a body portion 13 of appropriate materials and marginal reinforcing edges or binding means 14.

The mat is normally coiled or rolled within the casing as shown in Figure 3, and the inner end thereof is anchored as indicated at 15 to the end head of a rotary reeling and winding drum. The disc-like heads are distinguished by the numerals 16. Also mounted between these heads is an elongated rectangular box-like housing 17 which contains the mechanical operating means for rolling and unrolling the mat. The means comprises a stationary or fixed feed screw 18 and a companion actuating screw 19.

The later screw includes an end extension 20 projecting through the right hand end of the casing, and a similar extension 21 projecting through the left hand end of the casing and provided with an upstanding arm 22 having a buffer roller 23 on its terminal upper end. The numeral 24 designates a return spring.

The co-operation of the spiral threads on the parts 18 and 19 is the means for winding and unwinding the mat on the reel or drum. The features 22 and 23 are located within the path of swinging motion of the door 7. Consequently, as the door is swung open, it engages the buffer 23 and this acts on the upstanding arm 22 which in turn exerts a longitudinal stress or pull on the extension 21 of the actuating screw shaft 19.

The longitudinal movement of this shaft 19 along the threads of the main feed screw 18 obviously serves to rotate the reeling drum in such a manner as to unwind the mat 12 and to project the free end portion thereof outwardly and to place it in the dotted line position shown in Figure 4 where it may be used for wiping one's shoes before entering or leaving the car.

As the door is swung to closed position, the return spring 24 comes into play to return the parts 19 to its normal position and this obviously produces a reverse rotation of the drum and winds the mat back into the casing.

The gist of the invention is in the provision of a reel on which a foot mat is coiled, together with door actuated means for rotating the reel in one direction, and spring actuated means for rotating the reel in the opposite direction, whereby to permit the mat to be wound and unwound in the desired manner.

For sake of protection, a casing is provided for the reel and the mat and inasmuch as the mat is normally wound up on the reel it is thereby maintained in a protective casing while not in use, yet projected to effective or usable position when the occupant of the car leaves or enters.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. An attachment of the class described comprising a casing, a spring-wound drum in said casing, a foot mat coiled on said drum, said casing being provided with a slot through which the free end portion of the mat is projectable to permit the mat to be withdrawn from the casing to dispose it in operative position on an associated running board, and door actuated means associated with said drum for mechanically rotating the drum in a direction against the return spring to automatically project the mat to usable position.

2. In a structure of the class described, a casing comprising an attaching flange designed to be secured to an apron within the vicinity of a running board on an automobile, the outer front wall of said casing being provided adjacent the bottom with a slot to accommodate a foot mat, a spring returned drum mounted for rotation in said casing, said mat being normally coiled on said drum and confined within the casing, and mechanical means for rotating the drum in a direction against the tension of the spring to automatically project the mat to usable position.

3. In a structure of the class described, a casing comprising an attaching flange designed to be secured to an apron within the vicinity of a running board on an automobile, the outer front wall of said casing being provided adjacent the bottom with a slot to accommodate a foot mat, a spring-returned drum mounted for rotation in said casing, said mat being normally coiled on said drum and confined within the casing, and mechanical means for rotating the drum in a direction against the tension of the spring to automatically project the mat to usable position, said means comprising a feed screw carried by the drum and an associated longitudinal shiftable actuating screw in mesh with said feed screw.

4. In a structure of the class described, a casing comprising an attaching flange designed to be secured to an apron within the vicinity of a running board on an automobile, the outer front wall of said casing being provided adjacent the bottom with a slot to accommodate a foot mat, a spring-returned drum mounted for rotation in said casing, said mat being normally coiled on said drum and confined within the casing, and mechanical means for rotating the drum in a direction against the tension of the spring to automatically project the mat to usable position, said means comprising a feed screw carried by the drum and an associated longitudinally shiftable actuating screw in mesh with said feed screw, said actuating screw being provided with an extension having operating arms provided with a buffer on its terminal end and said buffer arm being located within the path of swinging motion of the door, whereby to permit the door to bring said actuating screw into play.

In testimony whereof I affix my signature.

FRED KLEIN.